United States Patent [19]

Caviness

[11] Patent Number: 4,536,985
[45] Date of Patent: Aug. 27, 1985

[54] SELF-PROPELLED, PREPROGRAMMABLE FISHING LURE

[76] Inventor: Robert J. Caviness, 1601 18th St. NW. Apt. 210, Washington, D.C. 20009

[21] Appl. No.: 524,752

[22] Filed: Aug. 19, 1983

[51] Int. Cl.³ .................. A01K 85/01; A01K 85/06
[52] U.S. Cl. .................................. 43/17.6; 43/26.2; 43/42.06; 446/158
[58] Field of Search .............. 43/26.2, 17.6, 42.06, 43/2.3, 3; 446/153, 161, 162, 163, 164, 158

[56] References Cited

U.S. PATENT DOCUMENTS

| | | | |
|---|---|---|---|
| 2,854,776 | 10/1958 | Van Sant | 43/26.2 |
| 2,955,375 | 10/1960 | Mitchell | 43/17.6 |
| 3,007,432 | 11/1961 | Still | 446/161 |
| 3,046,697 | 7/1962 | Pullen | 446/164 |
| 3,721,033 | 3/1973 | Haynes | 43/17.6 |

FOREIGN PATENT DOCUMENTS 617831 6/1980 Switzerland .................. 43/17.6

Primary Examiner—Nicholas P. Godici
Assistant Examiner—Chris McKee
Attorney, Agent, or Firm—B. C. Killough

[57] ABSTRACT

This invention relates to a self-propelled, preprogrammable fishing lure which utilizes a first timer whose interval of operation may be varied by the user to control a second timer which in turn operates a propulsion means over a predetermined period of time, and which allows for an interval period of deactivation of the pump and motor by causing the variable interval of operation of the first timer to be greater than the operation period of the propulsion means.

11 Claims, 4 Drawing Figures

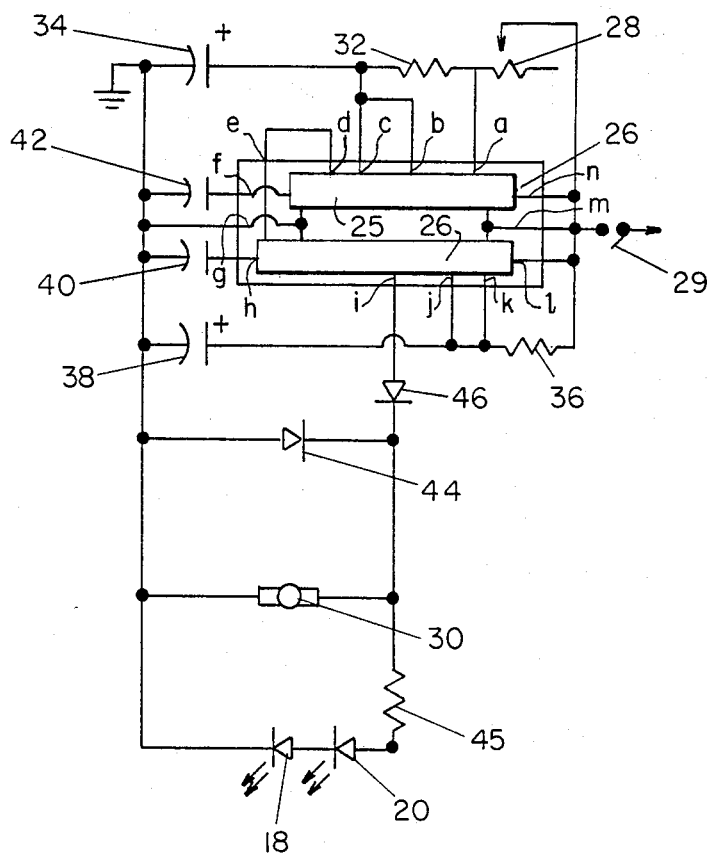
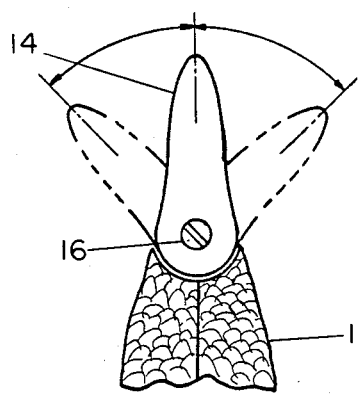
FIG 3
FIG 4

SELF-PROPELLED, PREPROGRAMMABLE FISHING LURE

BACKGROUND OF THE INVENTION

This invention relates to artificial fishing lures in general, and more specifically to an artificial fishing lure which is self-propelled and whose movement through the water is adjustable and may be predetermined by the user.

Artificial fishing lures are widely used and accepted. Generally, the movement of these lures through the water is controlled by the fisherman's manipulation of the lure through the attached line and fishing reel. An experienced fisherman can simulate the movement of live bait or prey moving through the water, but the effectiveness of the lure depends solely upon the expertise of the fisherman.

Artificial lures which are not self-propelled are pulled through the water by line attached to the lure. While the speed at which the lure is pulled through the water may be varied, the lure may only be pulled back toward the user. The lure must be cast, reeled in, and then re-cast. It cannot be left in the water and allowed to move about on its own without re-casting. The pulling of the taught line through the water causes a disturbance in the water which may be distracting to fish.

The prior art reveals various self-propelled lures. These lures aid the fisherman by providing their own movement through the water, reducing the particular expertise required to attract fish to the bait. Some of these devices have provided a means for varying the movement through the water, but the operation of the lure itself may not be changed by the user. These devices operate in a manner which is predetermined by the manufacturer, and the operation is not variable by the user.

Injured and dying fish and other prey to which feeding fish are attracted move in an erratic, intermittent motion. The self-propelled devices revealed by the prior art move about in a continuous motion. The user cannot adjust the device to allow for variable, intermittent operation which simulates the movement of injured prey.

Accordingly, it is an object of this invention to provide a fishing lure which is self-propelled and which may be pre-set by the user to achieve the desired propulsion.

Another object of the invention is to provide a fishing lure which has increased attractiveness to fish while reducing the expertise required to be a successful fisherman.

Yet another object of the invention is to provide a fishing lure which is exceptionally attractive to fish as prey by simulating the movement of live prey through the water.

Still another object of the invention is to provide a fishing lure which is self-propelled but whose movement through the water may be varied by the user by predetermining the length of time during which the propulsion means is actuated as opposed to the length of time which it is inactive.

A further object of the invention is to provide a lure which can be effective while remaining in the water for long periods of time.

Still a further object of the invention is to increase the attractiveness of the lure to fish through the use of light emitting diodes which are variable and periodic in their operation and are visible to fish.

SUMMARY OF THE INVENTION

The artificial fishing lure of the present invention is self-propelled by having a pump means which draws water in through an inlet and discharges water through an outlet. This method of propulsion is seen as superior to much of the prior art, in that it does not require a propeller or other rapidly moving water displacing object attached to the exterior body of the fishing lure. The pump is driven by a small electric motor, both of which are internally contained. By varying the time over which the electric motor is actuated, the movement of the lure through the water may be varied. The motor and pump are actuated for a few seconds, then deactivated for a few seconds, as chosen by the user. This variable action will allow the lure to simulate the movement of a fish through the water by being variable in its movement. The user, of course, will be reeling the lure slowly in, further changing the movement and direction of the lure. The angle of the movement is varied prior to casting by manually changing the angle of the tail member which is attached to the body member.

The user may determine the amount of time at which the motor and pump are actuated, and the amount of time at which the motor and pump are at rest. This is accomplished through a user adjusted potentiometer, which controls timers which in turn control the actuation of the pump and motor.

The body member may be in any shape which simulates bait or prey upon which a fish might feed. It may be in the shape of a fish, a shrimp, a squid, or other bait. The body member should have hooks attached to it and may be made of plastic, fiberglass, wood, or other suitable member. It is generally hollow and contains the propulsion means and control means within it.

This invention provides a lure which, through its intermittent movement, simulates attractive prey on which fish will feed. By altering the angle of the tail member and the time over which the propulsion is actuated, the user can adjust the lure to maximum effectiveness. For example, the lure can be adjusted to remain in a particular sink hole or fish populated area. The device may be adjusted to compensate for current speed and direction as well.

BRIEF DESCRIPTION OF THE DRAWINGS

FIG. 3 is a circuit diagram of the control circuit.

FIG. 4 is a top, partial side view of the invention showing the tail member.

DESCRIPTION OF THE PREFERRED EMBODIMENT(S)

Figure 1:
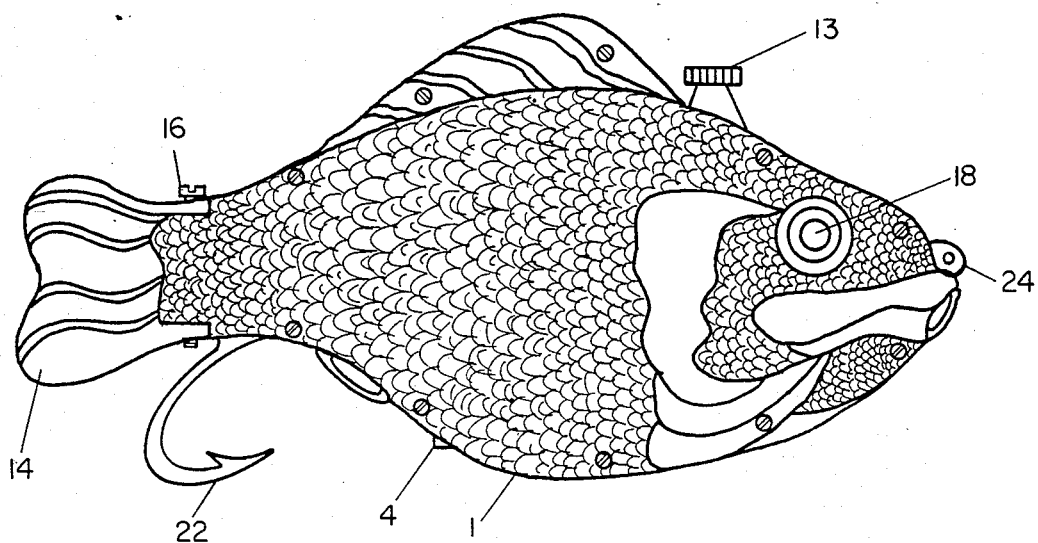
FIG. 1 is an elevated, side view of the invention.
Figure 2:
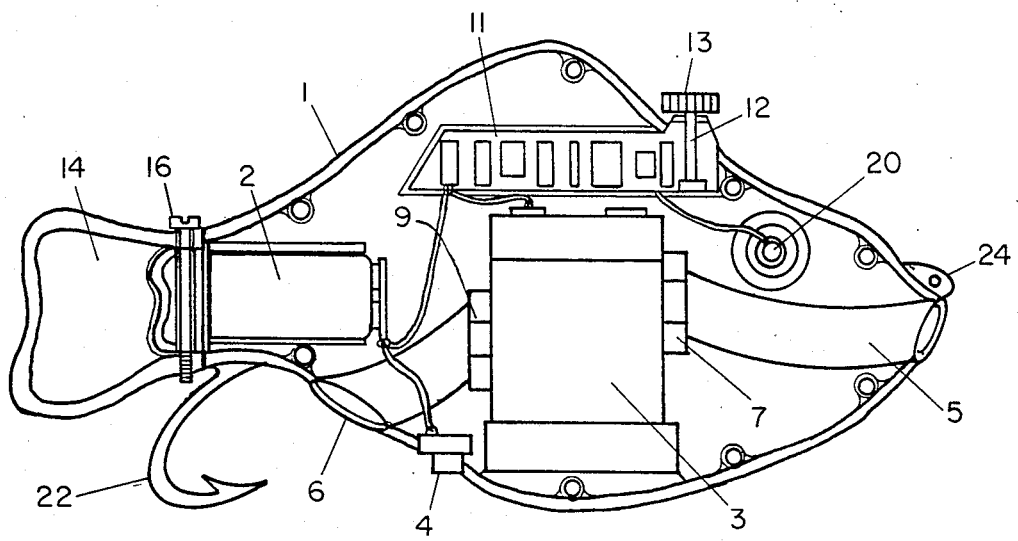
FIG. 2 is an elevated, side, sectioned view of the invention showing the propulsion and control means as located within the body member.

As is shown in the accompanying drawings, the body member 1 is in the shape of a fish, and is generally hollow. A nine volt transistor battery 2 is located near the tail section of the body member 1 as a power source. A miniature, submersible pump and motor 3 are located near the center of the body member, and are powered by the battery 2. A sealed on/off switch 4 is housed in the body member 1. The switch 4 may be actuated from the exterior of the body member 1. Teflon or similar plastic tubing 5 is attached to the intake side 7 of the pump 3, and is run to the front of the body member 1 and opens to the outside of the body member 1. A second section of Teflon or similar plastic tubing 6 is also attached to the outlet side 9 of the pump 3, and is run through the body member 1 to the rear of the body member 1. Water is then pulled in through the intake tube 5 to the pump 3, and discharged through the outlet tubing 6. Propulsion is thereby provided for the deivce without requiring a rapidly moving propeller or similar propulsion device to be attached to the exterior of the body member, which could be frightening and repulsive to fish.

A circuit board 11 is located in the body member 1 just above the miniature pump and motor 3. The circuit, which is hereinafter more fully described, allows for variable, intermittent operation of the pump and motor 3, simulating the intermittent swimming action and motion of live bait. Control of this variable feature is accomplished by adjusting the variably adjustable resistor, or potentiometer 28 through rotation of the potentiometer shaft 12, which has a knurled member 13 on the end of the shaft 12 operable from the exterior of the body member 1. The potentiometer shaft 12 is sealed to prevent water from entering the body member 1.

As shown in FIG. 4, the tail member 14 is hinged so that the movement of the apparatus through the water may be varied. The user may desire that the apparatus veer to the left or veer to the right either as a matter of preference or to overcome water currents. A set screw 16 running through the tail member 14 and the body member 1, when loosened, allows the angle of the tail member to be altered. After adjusting to the desired angle, the screw may be tightened to hold the tail member in the desired position.

Two (2) light emitting diodes 18, 20 are incorporated in a position which would correspond to the eyes of a fish and are visible from the external surface of the body member 1. Each of the light emitting diodes 18, 20 is powered by the battery 2 and controlled by the circuit so as to be actuated when the pump and motor 3 are actuated, and not visible when the pump and motor are not actuated.

One or more of hooks 22 may be located on the external surface of the body member 1 for hooking and holding the caught, live fish. An eyelet 24 for attaching the device to the fishing line is provided at the front of the body member 1.

The variable operation of the pump and motor is controlled by the circuit which is shown and described in FIG. 3. The circuit incorporates either a first and second timer, or a dual timer 26 such as a five-five-six (556) dual timer. The first timer 25 periodically fires an impulse which actuates the second timer 27. The second timer 27 then causes the pump motor 30 to operate for a fixed period of time, which in the preferred embodiment is three to five seconds. The period or interval between impulses emitted by the first timer 25 is controlled through the use of a variably adjustable resistor 28, or potentiometer.

The five-five-six (556) dual timer as used in the preferred embodiment is a monolithic chip. This timer is conventional and known in the art. As shown in FIG. 3, the timer 26 is connected to the external circuitry at output and control terminals a through n. While the timer is a monolithic chip, for demonstrative purposes, the timer is shown as having a first timer portion 25 and a second timer portion 27. These terminals are designated in FIG. 3 as follows:

| First timer section 25: | |
| --- | --- |
| Discharge | a |
| Threshold | b |
| Trigger | c |
| Output | d |
| Control Voltage | f |
| Reset | n |
| Second timer section 26: | |
| Trigger | e |
| Control Voltage | h |
| Output | i |
| Discharge | j |
| Threshold | k |
| Reset | l |

The positive voltage terminal is designated m and the ground g.

Power is supplied by a direct current battery, such as a nine volt alkaline battery 2. Power to the circuit is actuated by a switch 29. A one thousand ohm resistor 32 controls the charge rate of a one hundred microfarad capacitor 34. This capacitor 34 is further controlled by the use of a variably adjustable zero to one megaohm resistor 28. Through the use of resistor 28 the charge rate of capacitor 34 may be varied, which in turn allows the interval between pulses from the first timer 25 of the dual timer 26 to be varied. Resistor 32 is used to control the charge rate of capacitor 34 and insures that the interval between impulses is not reduced, via adjustment of resistor 28, to an interval less than the operational period or pump motor 30. When capacitor 34 fully charges, it triggers through c a voltage input to the first timer portion of the 556 dual timer 26. The first timer 25 of the dual timer 26 then sends a pulse from output d into trigger e causing the second timer 27 of the dual timer to operate, which in turn causes the pump motor 30 to actuate, propelling the device through the water as previously described. When the second timer 27 begins to operate, capacitor 38 begins to charge. Once capacitor 38 is completely charged, it causes the second timer 27 to turn off via discharge j, and in turn deactivates the pump and motor 30. Capacitor 38 also resets and enables the first timer via reset n. The first timer then continues to operate as before, and causes the cycle to repeat itself at a period predetermined by the setting of the variably adjustable resistor 28. Through the use of a one hundred (100) kilo ohm resistor 36 and a twenty-two (22) microfarad capacitor 38, the period over which the second timer 27 causes the pump and motor 30 to actuate is in the range of three to five seconds. The time constant, or product of resistor 36 times capacitor 38 (RC), should be in the range of 2.2. This period of operation could be changed by the use of different resistors and capacitors, or by using a second variably adjustable resistor in conjunction with the capacitor.

Two 0.05 microfarad capacitors 40, 42 are used to set control voltage polarity to trigger on positive polarity through f, h. Two diodes 44, 46 are used to prevent pulse feedback from the pump motor 30 to the timer circuit. Two light emitting diodes 18, 20 are also included in the circuit, and operate while the pump motor 30 is actuated, being controlled by the second timer in the same manner as the pump motor 30 is controlled. A one kilo ohm resistor 45 is placed in the circuit to limit the current to the light emitting diodes.

An alternative embodiment is to provide propulsion by the use of a chemical compound, such as calcium carbonate, to emit a gas, such as carbon dioxide, when mixed with water. The circuit as described herein is used to periodically allow water to mix with calcium carbonate. The chemical reaction and resulting release of gas would cause the device to be propelled through the water. The circuit would then interrupt the expulsion of this gas, resulting in an interruption of the movement of the device through the water. In this way, the device could move in a variable and erratic motion which would simulate the action of bait moving through the water.

What is claimed is:

1. A self-propelled, preprogrammable fishing lure, comprising:
   (a) a hollow body member;
   (b) a propulsion means located in said body member;
   (c) a direct current voltage source for powering said propulsion means; and
   (d) electronic circuit means for causing said propulsion means to operate automatically in a variable, intermittent manner once said voltage source is actuated.

2. A self-propelled, preprogrammable fishing lure, comprising:
   (a) a first timer means which emits an electrical impulse at a predeterminable interval;
   (b) means by which to vary said interval at which said first timer emits said impulse;
   (c) propulsion means to propel said fishing lure through water;
   (d) a second timer means which actuates said propulsion means for a predetermined period of time upon receipt of said impulse from said first timer;
   (e) a direct current voltage source to power said first and second timer means and said propulsion means;
   (f) a switch means to actuate said direct current power source;
   (g) a hollow, waterproof body member in which to contain said fishing lure;
   (h) a multiplicity of hooks attached to said body member; and
   (i) a tail member attached to said body member, which is variable in angle relative to said body member.

3. A self-propelled, preprogrammable fishing lure as described in claim 2, wherein said means by which to vary said interval at which said first timer emits said impulse comprises:
   (f) a variably adjustable time delay resistor;
   (g) a second resistor; and
   (h) a capacitor.

4. A self-propelled, preprogrammable fishing lure as described in claim 3, further comprising a resistor and a capacitor to predetermine said period of time said second timer actuates said propulsion means.

5. A self-propelled, preprogrammable fishing lure as described in claim 4, further comprising a resistor and two light emitting diodes which are actuated by said second timer and which are visible from the exterior surface of said body member.

6. A self-propelled, preprogrammable fishing lure as described in claim 3, wherein said second resistor is a one kilo ohm resistor and said capacitor is a one hundred microfarad capacitor.

7. A self-propelled, preprogrammable fishing lure as described in claim 4, wherein said resistor is a 100 kilo ohm resistor and said capacitor is a 22 microfarad capacitor.

8. A self-propelled, preprogrammable fishing lure as described in claim 4, further comprising a variably adjustable time delay resistor to vary said period of time said second timer actuates said propulsion means.

9. A self-propelled, preprogrammable fishing lure as described in claim 1, 2, 3, 4, 5, 6, 7 or 8, wherein said propulsion means comprises:
   (a) a pump means;
   (b) a direct current motor means to actuate said pump means;
   (c) an intake tube opening to the front of said body member and connected to said pump means; and
   (d) an outlet tube connected to said pump means and opening to the rear of said body member.

10. A self-propelled, preprogrammable fishing lure as described in claim 9, further comprising a multiplicity of diodes placed in a circuit between said second timer and said motor means to prevent pulse feedback from said motor means.

11. A self-propelled, preprogrammable fishing lure as described in claim 9, further comprising a means by which to vary the angle of water exhausted from said outlet tube.

* * * * *